(No Model.)
D. C. CRAWFORD.
ADJUSTABLE VEHICLE AXLE.
No. 454,397. Patented June 16, 1891.
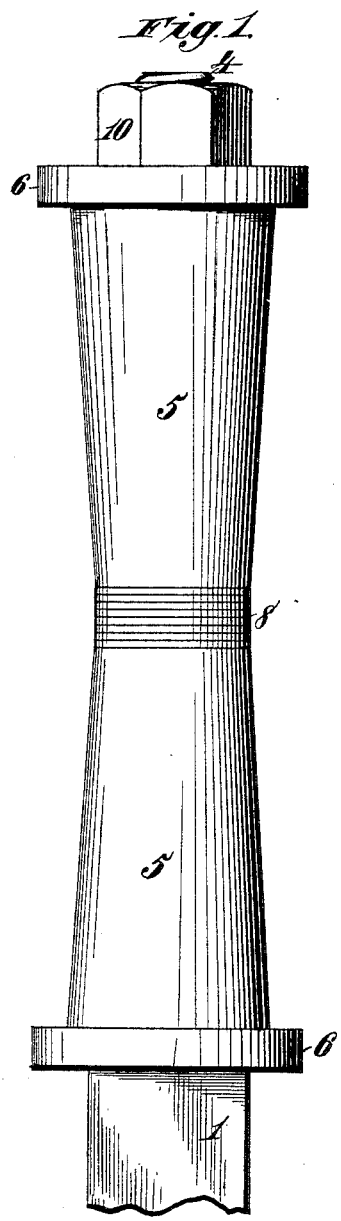
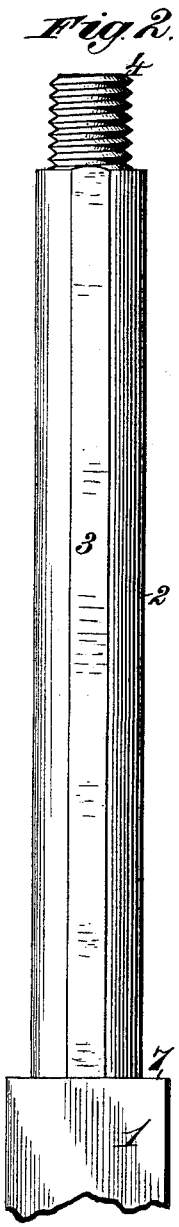
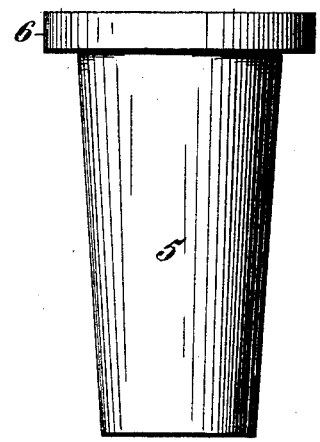
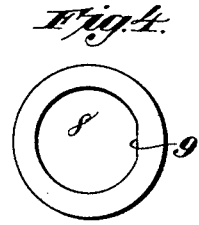
Witnesses,
Robert Everett,
J. A. Rutherford.
Inventor:
David C. Crawford,
By James L. Norris,
Atty.

UNITED STATES PATENT OFFICE.

DAVID C. CRAWFORD, OF BIG RAPIDS, MICHIGAN.

ADJUSTABLE VEHICLE-AXLE.

SPECIFICATION forming part of Letters Patent No. 454,397, dated June 16, 1891.

Application filed August 29, 1890. Serial No. 363,459. (No model.)

*To all whom it may concern:*

Be it known that I, DAVID C. CRAWFORD, a citizen of the United States, residing at Big Rapids, in the county of Mecosta and State of Michigan, have invented a new and useful Adjustable Vehicle-Axle, of which the following is a specification.

My invention relates to improvements in axles for vehicles of various kinds, such as buggies, road-carts, carriages, busses, hacks, wagons, &c.; and the objects of my improvements are, first, to provide a novel, simple, and effective means for so adjusting the axle of a vehicle as to insure a close-fitting bearing, and thereby prevent racking of the wheel, and, second, to get the nut into a position where it will not come in contact with any revolving part, thereby avoiding any necessity of employing left-hand nuts and obviating the danger of the nuts being turned off by the backward motion of the wheel when backing or turning the vehicle.

The invention consists in the construction and combination of parts in an adjustable vehicle-axle, as hereinafter described and claimed.

In the annexed drawings illustrating the invention, Figure 1 is a view of one end of an axle provided with my improvements. Fig. 2 is a view of the axle-spindle, from which the sleeves, washers, and nut have been removed. Fig. 3 is a view of one of the tapering or conical sleeves detached. Fig. 4 is a view of one of the washers.

Referring to the drawings, the numeral 1 designates a portion of a vehicle-axle, and 2 its spindle, which is provided on one side with a flattened surface 3, that extends the entire length of the spindle, exclusive of the screw-threaded outer end 4, as shown in Fig. 2.

The numeral 5 designates two conical or tapering sleeves, each of which is provided with a flange 6 at its large end. These sleeves 5 are so formed internally as to correspond with the contour of the flattened straight spindle 2, so that when the sleeves are in position on the spindle they will be prevented from turning thereon.

One of the sleeves 5 is placed on the axle-spindle with its larger end inward, and its flange 6 bearing against the axle-shoulder 7, as shown in Fig. 1, and a number of washers 8 are then placed on the spindle adjacent to the smaller end of the sleeve. The washers 8 are each formed, as shown in Fig. 4, with an opening having a flattened surface 9 on one side that corresponds with the flattened surface 3 on the axle-spindle, thus preventing the washers from turning. The innermost sleeve 5 and the washers 8, having been first placed on the spindle and the vehicle-wheel put in position, the outermost sleeve 5 is then slipped onto the spindle and into the wheel-hub, with the small end of said sleeve inward and against the washers. A nut 10 is then screwed onto the threaded end 4 of the axle-spindle adjacent to and bearing against the flange 6 of the outermost sleeve, and the vehicle-wheel is thus secured in place and is free to revolve in either direction without any liability of disturbing or loosening the nut.

To remove the wheel of the vehicle the nut 10 is taken off and the outside sleeve withdrawn.

To adjust the reversely-placed sleeves 5, Figs. 1 and 3, one or more of the washers 8 may be removed, which enables the sleeves to be brought closer together, thus taking up the slack or play in the bearing both endwise, by bringing the flanges 6 closer together, and sidewise, by reason of the tapered external surfaces of the adjustable sleeves. It will thus be seen that by varying the number of the washers placed intermediate to the adjacent ends of the sleeves the bearing can be readily adjusted, as may be required.

What I claim as my invention is—

1. In a vehicle-axle, the combination, with the axle-spindle 2, of the tapering stationary sleeves 5, reversely placed on said spindle, with the smaller ends of said sleeves adjacent to each other, a number of washers 8, placed on the axle-spindle between the adjacent ends of the sleeves, and a nut 10, placed on the outer screw-threaded end of the axle-spindle, substantially as shown and described.

2. In a vehicle-axle, the combination, with the axle-spindle 2, of the stationary tapering sleeves 5, having flanges 6 at their large ends, said sleeves placed on the axle-spindle in reverse position with their small ends adjacent to each other, the washers 8, placed on the axle-spindle between the adjacent ends of the sleeves, and the nut 10 on the outer end of the axle-spindle, substantially as shown and described.

DAVID C. CRAWFORD.

Witnesses:
SAML. J. THORP,
F. E. RICE.